April 25, 1961
J. DE SANTIS
2,980,974
CABLE TENSIONER
Filed May 21, 1958
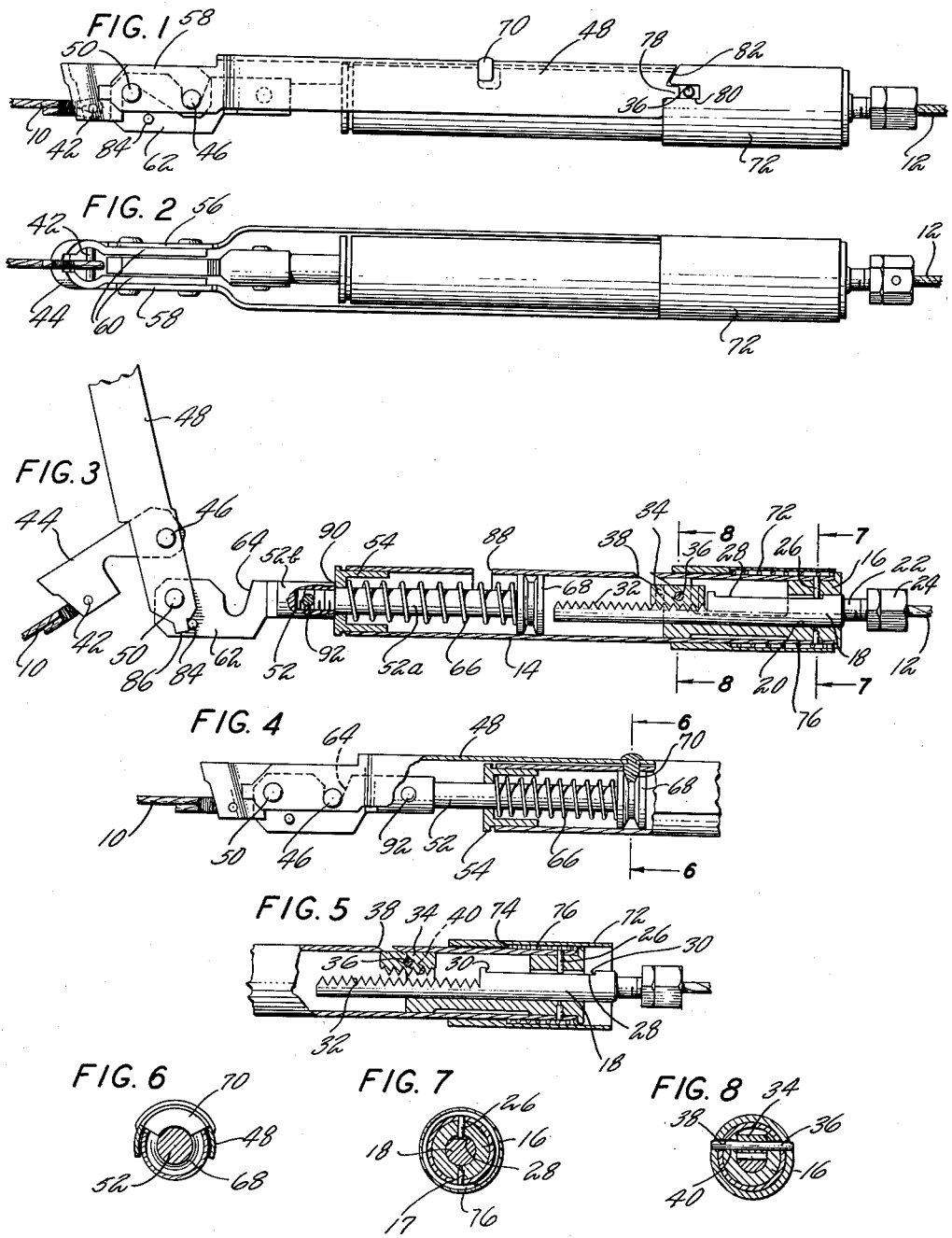
INVENTOR
JOSEPH DE SANTIS
BY Charles A. Warren
ATTORNEY

United States Patent Office 2,980,974
Patented Apr. 25, 1961

2,980,974

CABLE TENSIONER

Joseph De Santis, East Hartford, Conn., assignor to United Aircraft Corporation, East Hartford, Conn., a corporation of Delaware Filed May 21, 1958, Ser. No. 736,784

6 Claims. (Cl. 24—68)

This present invention relates to a cable tensioner for use, for example, in connecting the ends of cables under a predetermined tension.

One feature of the invention is a tensioner which provides for adjustment of the tension to be applied to the cable and which, when the tensioner is in position, will retain the established tension. Another feature is an arrangement for locking the cable tensioner such that it has a fixed length after the tension is applied so that a pull on the cable will be transmitted directly through the tensioner.

Other features and advantages will be apparent from the specification and claims, and from the accompanying drawings which illustrate an embodiment of the invention.

Fig. 1 is a side elevation of the tensioner.

Fig. 2 is a plan view of the tensioner of Fig. 1.

Fig. 3 is a sectional view of the tensioner in open position.

Fig. 4 is a fragmentary elevation view of a part of the tensioner in closed and locked position.

Fig. 5 is a longitudinal sectional view of a detail.

Fig. 6 is a transverse sectional view along the line 6—6 of Fig. 4.

Fig. 7 is a transverse sectional view along the line 7—7 of Fig. 3.

Fig. 8 is a transverse sectional view along the line 8—8 of Fig. 3, the outer sleeve being removed.

The device shown is intended to provide a quick attachment and tensioning means for connecting the ends 10 and 12 of cables so that a pull on either cable end 10 or 12 will move the other cable end a corresponding amount. The unit includes a sleeve 14, Fig. 3, having a cap 16 fastened in one end thereof, as by a radial pin 17, Fig. 7, and receiving a rod 18 slidable in a bore 20 in the cap. This rod carries a threaded tip 22 to receive the socket 24 suitably attached to the cable end 12.

The rod 18 has a limited axial movement which is determined by a radial pin 26 extending through the cap 16 and engaging a flat surface 28, Fig. 7, on one side of the rod 22. The flat surface has end abutments 30, Fig. 5, which engage with the pin and prevent excessive axial movement of the rod.

The inner end of the rod has a serrated surface 32, Fig. 5, in a position to be engaged by a lock or latch 34 having cooperating serrations. The lock has a pin 36 extending therethrough and also through an obliquely extending slot 38 in the sleeve 14. The end cap 16 also has an obliquely extending slot 40 in alignment with the slot 38, as shown in Fig. 8. With this arrangement, the rod 18 is movable to the left since this movement carries the lock 34 away from the serrations 32. Movement of the rod 18 to the right, however, causes interengagement between the serrations on the lock and those on the rod and draws the lock into secure locking engagement to prevent further rod movement to the right. Where axial movement of rod 18 to the right is desired, the operator may hold the lock in inoperative position by the pin 36.

The cable end 10 is mounted on a transverse pin 42 in a connector 44 which in turn is pinned as at 46 to a lever arm 48. The pin 46 is spaced longitudinally on the lever arm 48 from a pivot pin 50 on the end of the rod 52 slidable in an end cap 54 fitting within the end of the sleeve 14 remote from the cap 16. As shown, the end of the lever carrying the pins 46 and 50 is bifurcated to receive between the two legs 56 and 58, Fig. 2, the opposite parallelly extending ends 60 of the connector 44. The ends 60 of the connector in turn straddle the flattened head 62 on the end of the rod 52.

The head 62 has a deep notch 64 therein which receives the pin 46, as shown in Fig. 4. It will be apparent that the pin 46 is offset laterally from the pin 50 so that when the lever arm 48 is in the locking position of Fig. 1 and Fig. 4, the pin 46 will have moved beyond dead center position so that any pull on the cable end 10 tends to keep the lever arm in locking position. The lever in moving from the full line position of Fig. 3 to that of Fig. 4 will provide a predetermined decrease in the effective length of the tensioner.

The rod 52 is urged to the right by a surrounding spring 66 positioned between the end cap 54 and a grooved head 68 on the inner or right hand end of the rod 52. This spring applies a tension to the cable ends as the lever arm 48 is moved from the position of Fig. 3 into the closed position of Fig. 4. When the lever arm is in closed position, a projecting ring segment 70 carried by the lever arm, which at this point is substantially semi-circular in cross section, as shown in Fig. 6, engages a slot or opening 88 in the sleeve 14 and also engages in the groove in the head 68. This securely locks the rod 52 and lever arm against axial movement in either direction. The segment 70 is located for the most part within the lever arm but has a headed-over outer edge by which the segment is held in position as shown in Fig. 4.

The lever arm 48 is retained in the closed position of Figs. 1 and 4 by a sleeve 72 slidable over the right hand end of the main sleeve 14. This sleeve has a shoulder 74 in its inner surface in a position to engage with the left hand end of a spring 76 surrounding the end of the main sleeve 14 and engaging with the cap 16. This spring 76 allows sleeve 72 to be slid axially so that the end of the lever arm 48 may be moved into the position of Fig. 1 with a projection 78 thereon engaging a notch 80 in the left hand end of the sleeve 72, as best shown in Fig. 1. The sleeve 72 may have an obliquely extending surface 82 to be engaged by the projection 78 so that movement of the lever into the locking position of Fig. 1 will urge the sleeve 72 to the right.

The pin 36 which carries the latch 34 also projects into the notch 80, as best shown in Fig. 1, and limits the movement of the sleeve 72 to the left. The positioning of the pin 36 in the notch 80 serves another function in that the lock 34 cannot be moved out of locking engagement with the serrations 32 on rod 18 unless the sleeve 72 is moved far enough to the right, as indicated in Fig. 5, so that the pin 36 will be disengaged from the notch 80 thereby permitting the pin to slide upwardly in the grooves 38 and 40.

In operation, the cable ends 10 and 12 are attached respectively to the connector 44 and the projecting stud 22 while the lever arm 48 is in the position of Fig. 3. Further counterclockwise movement of the lever arm 48 from the position shown in Fig. 3 may be limited by a pin 84 carried by the head 62 and engaging with a projecting end 86 on the lever arm.

Once the cable ends are attached, the sleeve 72 is slid to the right to disengage the pin 36 and the position of the rod 18 may then be adjusted to take up any slack at the cable ends. This is done through the movement of the rod 18 with respect to the lock 34, as will be apparent. The lever arm 48 is then moved clockwise into the locking position of Figs. 1 and 4 causing the rod 52 to move to the left against the spring 66 and bringing the head 68 into alignment with a slot 88 through which the locking segment 70 projects. As the lever arm moves into locking position, the locking segment 70 engages securely with the head 68 and prevents further movement of the rod 52 within the sleeve 14. Thus the tension on the cable ends is determined by the design strength of the spring 68 since the tensioner in locking position will always return the rod 52 to the position of Fig. 4. If more tension is desired, a stronger spring may be substituted for the spring 66. Obviously, if in moving the lever arm 48 into locking position, the head 68 does not come into the position to be engaged by the lock 70, the axial position of the rod 18 may be adjusted by returning the lever 48 to the unlocked position of Fig. 3. If desired, the rod 52 may have a shoulder 90 engaged with the outer end of cap 54 to limit the right hand movement of the rod.

For assembly purposes, it may be desirable to make the rod 52 of two parts, that is a portion 52a which is surrounded by the spring 66 and another portion 52b which includes the head 62 and extends back to the shoulder 90. The parts 52a and 52b may be threaded together and held as by a pin 92, as shown in Fig. 3. With an arrangement of this type, the cap 54 may be welded in the end of the sleeve 14 without interfering with the assembly of the parts of the tensioner.

It is to be understood that the invention is not limited to the specific embodiment herein illustrated and described, but may be used in other ways without departure from its spirit as defined by the following claims.

I claim:

1. In a cable tensioner, a sleeve, a rod slidable in the sleeve and having a projecting end, a spring within the sleeve urging the rod axially into the sleeve, a lever mounted on said rod and having a cable attachment thereon, said lever being operable to effect a selected decrease in the length of the tensioner, said lever being adapted to extend over a portion at least of said sleeve, a projection on said lever and an opening in said sleeve engageable by said projection to prevent axial movement of the rod and lever when said opening and projection are in engagement.

2. In a cable tensioner, a sleeve, a rod slidable in the sleeve and having a projecting end, a spring within the sleeve urging the rod axially into the sleeve, a lever mounted on said rod and having a cable attachment thereon, said lever being operable to effect a selected decrease in the length of the tensioner, said lever being adapted to extend over a portion at least of said sleeve, a projection on said lever and an opening in said sleeve engageable by said projection to prevent axial movement of the rod and lever when said opening and projection are in engagement, said rod having a notch therein to receive the end of the projection.

3. In a cable tensioner, a first sleeve, a rod slidable in the sleeve and having a projecting end, said rod having serrations thereon, a latch within said first sleeve engageable with said serrations, said latch being movable radially within said first sleeve to disengage said latch and a second sleeve axially slidable on and surrounding said first sleeve to engage with the latch when in rod-locking position.

4. In a cable tensioner, a first sleeve, a rod slidable in the sleeve and having a projecting end, said rod having serrations thereon, a latch within said first sleeve engageable with said serrations, said latch being movable radially within said first sleeve to disengage said latch and a second sleeve axially slidable on and surrounding said first sleeve to engage with the latch when in rod-locking position, said latch having a projecting pin and said first sleeve having a slot therein to receive and guide the pin.

5. In a cable tensioner, a first sleeve, a rod slidable in the sleeve and having a projecting end, said rod having serrations thereon, a latch within said first sleeve engageable with said serrations, said latch being movable radially within said first sleeve to disengage said latch and a second sleeve axially slidable on and surrounding said first sleeve to engage with the latch when in rod-locking position, said latch having a projecting pin and said first sleeve having a slot therein to receive and guide the pin, said second sleeve having a notch extending axially of the second sleeve to receive an end of the pin.

6. In a cable tensioner, a first sleeve, a rod slidable in the sleeve and having a projecting end, said rod having serrations thereon, a latch within said first sleeve engageable with said serrations, said latch being movable radially within said first sleeve to disengage said latch and an axially slidable second sleeve surrounding said first sleeve to engage with the latch when in rod-locking position, said latch having a projecting pin and said first sleeve having a slot therein to receive and guide the pin, said second sleeve having an axial notch to receive an end of the pin, said first sleeve having a second rod slidable therein and having a projecting end, a spring within the first sleeve urging the rod into the first sleeve, a lever on said second rod having a cable attachment and being operable to effect a selected decrease in the length of the tensioner, said lever being adapted to extend over a portion at least of said first sleeve, said axially slidable second sleeve engaging said lever to hold said lever in position over first sleeve.

References Cited in the file of this patent

UNITED STATES PATENTS

| | | |
|---|---|---|
| 771,312 | Koehler | Oct. 4, 1904 |
| 918,062 | King | Apr. 13, 1909 |
| 1,408,309 | Saeter et al. | Feb. 28, 1922 |
| 1,801,159 | Hunter | Apr. 14, 1931 |
| 1,997,836 | Steinberg | Apr. 16, 1935 |
| 2,467,006 | Bliss | Apr. 12, 1949 |
| 2,550,018 | Morrison | Apr. 24, 1951 |

FOREIGN PATENTS

| | | |
|---|---|---|
| 452,217 | Great Britain | Aug. 18, 1936 |